Nov. 2, 1937. G. W. CARLSON 2,098,084
SEALING DEVICE AND ASSEMBLY
Filed Jan. 31, 1936
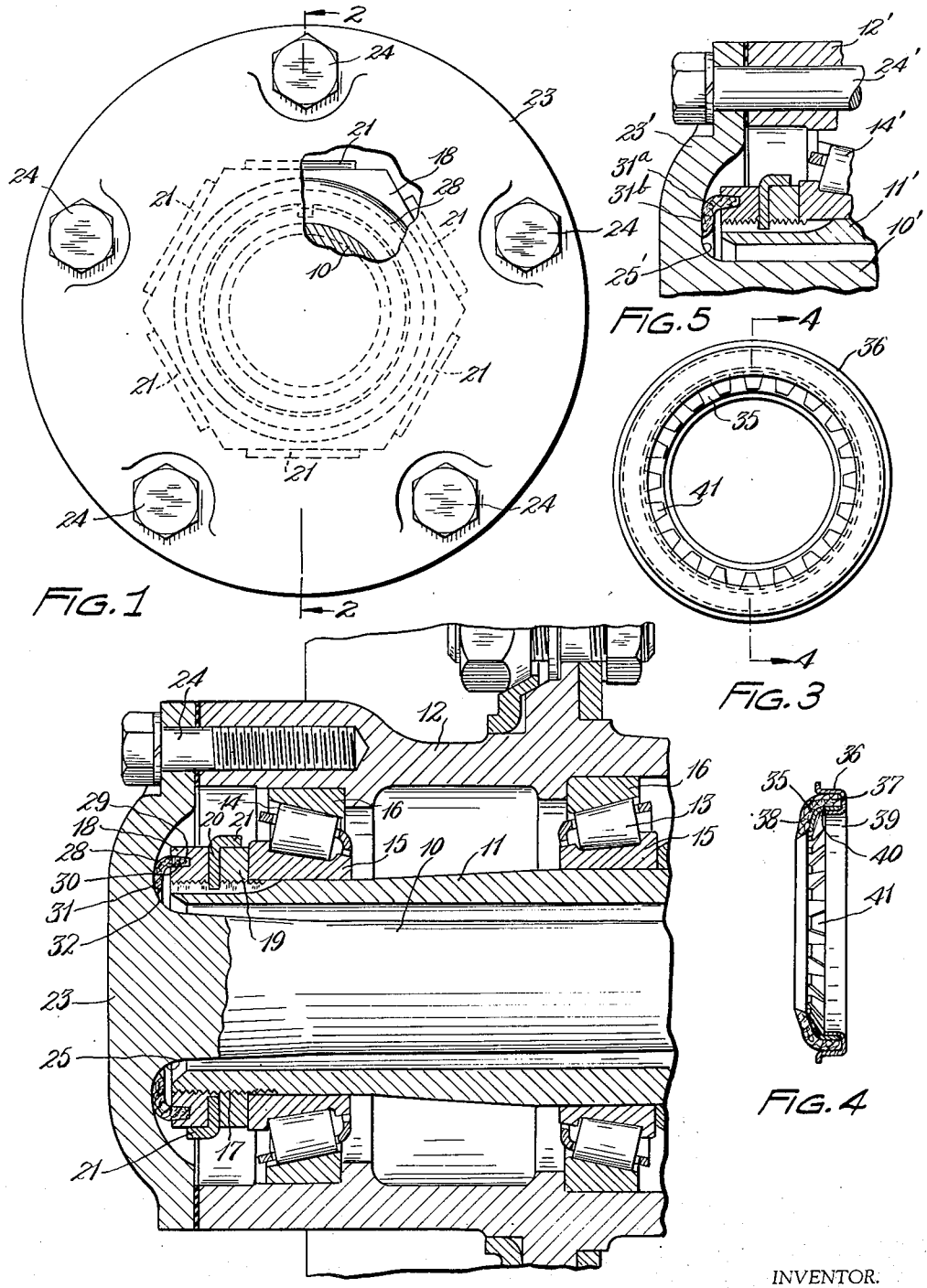
INVENTOR.
GUSTAV W. CARLSON
BY Kwis Hudson & Kent
ATTORNEYS Patented Nov. 2, 1937

2,098,084

UNITED STATES PATENT OFFICE 2,098,084

SEALING DEVICE AND ASSEMBLY

Gustav W. Carlson, Cleveland Heights, Ohio, assignor to Eaton Manufacturing Company, Cleveland, Ohio, a corporation of Ohio Application January 31, 1936, Serial No. 61,782

1 Claim. (Cl. 286—5)

This invention relates to seals, and more particularly, to fluid retaining seals for preventing leakage of lubricant or other fluid around a shaft or like part.

An object of the present invention is to provide an improved fluid retaining seal comprising a flange extending from a shaft and a flexible ring coaxial with the shaft and having a substantially radially extending flange with one face thereof pressed against the shaft flange.

Another object of this invention is to provide an improved fluid retaining seal comprising a ring of flexible material adapted to surround a rotary shaft and having an integral flange extending substantially radially inwardly and terminating with a relatively sharp edge, the flange part of the ring being adapted to be pressed laterally against an outwardly extending flange or shoulder of the shaft.

Other objects and advantages of the invention will be apparent from the following description when taken in conjunction with the accompanying drawing, wherein Fig. 1 is an end view, with portions broken away, showing a shaft assembly embodying my novel sealing device;

Fig. 2 is a sectional view taken on line 2—2 of Fig. 1;

Fig. 3 is a detached end view showing another form of my improved sealing member;

Fig. 4 is a sectional view thereof taken on line 4—4 of Fig. 3; and

Fig. 5 is a partial sectional view similar to Fig. 2 but showing a different relative arrangement for the parts.

My improved fluid retaining seal may be applied or adapted to various uses and structures, and is very serviceable and efficient when employed as a lubricant retaining seal for the axle tubes of motor vehicles. For purposes of illustration I have therefore shown my improved sealing arrangement in conjunction with an axle tube and wheel shaft but it will be understood, of course, that this is by way of example only and that the invention is not necessarily limited to this character of service nor to the specific construction illustrated.

In Figs. 1 and 2 of the drawing I have shown my improved sealing device embodied in an axle tube and wheel shaft assembly in which arrangement the sealing device serves to prevent the escape of lubricant from the outer end of the axle tube. In this arrangement an axle shaft 10 extends outwardly within the nonrotatable axle tube 11 and projects from the outer end of the axle tube. As is usual in assemblies of this kind, the axle shaft is coaxial with the tube and is rotatable therein but the diameter of the shaft is smaller than the diameter of the opening of the tube and the intervening space accommodates a supply of lubricant.

A wheel hub 12 disposed around the outer end of the axle tube is rotatably mounted thereon by a pair of axially spaced roller bearing assemblies 13 and 14. Each of these bearing assemblies includes an inner race 15 which is seated on the axle tube and an outer race 16 which is seated in the wheel hub. The outer end of the tube is threaded exteriorly thereof, as indicated at 17, and a pair of axially arranged nuts 18 and 19 are screwed thereon to retain the inner race 15 of the outer bearing 14 in place on the tube. A nut retainer 20 disposed between the nuts and keyed to the axle tube is provided with oppositely deflected lugs 21 which engage flats of the nuts to prevent accidental rotation thereof.

As is usual in assemblies of this kind the outer end of the axle shaft 16 is provided with an outwardly extending flange 23 which forms a driving connection between the axle shaft and the wheel hub. The wheel hub may be connected to the flange 23 by means of a series of circumferentially spaced clamping studs or bolts 24. The flange 23 may be of somewhat dished form, as shown in Fig. 2, with the concave face thereof presented to the outer end of the axle tube. The concave or dished inner face of the flange 23 may include an annularly extending concave fillet portion 25 at the junction of the flange with the axle shaft 10.

To prevent the escape of lubricant from the outer end of the axle tube, I provide my improved fluid retaining seal, which comprises a ring 28 of flexible material in cooperating relation to the inner face of the flange 23. The sealing member 28 may be formed of leather or any other suitable flexible material. According to my invention this sealing member may be supported from the outer end of the axle tube and may be so formed and arranged that it will be pressed against the adjacent face of the flange 23. I find that the sealing member may be conveniently supported from the axle tube by providing the nut 18 with an annular groove 29 in the outer end thereof and between the inner and outer peripheries of the nut, which receives the tubular portion 30 of the sealing member. This portion of the sealing member may be retained in the groove of the nut by any suitable means, such as by providing the groove with slightly tapered walls and pressing the end of the sealing member thereinto.

A characteristic feature of the sealing member 28 which enables the same to effectively prevent the escape of lubricant is that it is provided with an inwardly deflected or extending annular flange 31, the outer face of which always presses against the inner face of the shaft flange 23. I find that by forming the inner edge 32 of the flange 31 as a relatively sharp edge, the lubricant or other fluid is prevented from piling up against an end or shoulder of the sealing member and there is much less tendency for the fluid to find its way between the flange of the sealing member and the surface of the shaft flange 23.

In some instances, the sharp inner edge 32 may bear against the concave annular fillet portion 25, but this is not necessary in practicing the invention because I find that good results are obtained when, as shown in Fig. 5, the flange 31a of the packing bears against an annular section 31b of the axle flange 23' which is radially outwardly of the concave fillet portion 25'.

The sealing member may be of other forms of construction, and, in Figs. 3 and 4 of the drawing, I have illustrated another such form for this member. This sealing member, as shown in Figs. 3 and 4 of the drawing, may comprise a ring 35 of leather or other flexible material, and a metal member 36 providing a carrier for the flexible member. The member 35 may be of similar shape to the above described member 28, that is to say, it may have a tubular or ring part 37 and an inwardly extending substantially radial annular flange part 38 at one end thereof. The metal member 36 may comprise a ring part 39 having a groove therein to receive the ring part 37 of the flexible member and a flange part 40 projecting from the ring part and having a circumferentially extending series of resilient fingers 41 which bear against the annular flange part of the flexible member. When the sealing member of Figs. 3 and 4 is applied to a desired use, for example to a wheel tube and axle shaft assembly of the character shown in Figs. 1 and 2, the ring part of the metal member 36 may be mounted on the axle tube or may be pressed into the groove of the nut 18 such that the resilient fingers 41 yieldably press one face of the flange 38 of the flexible member against the inner face of the shaft flange 23. I find that the metal member 36 can be satisfactorily and economically constructed as a sheet metal stamping and, while not altogether necessary, its use in conjunction with the flexible member results in the attainment of certain advantages.

It will be understood, of course, that the sealing ring, in cooperating with the rotatable shaft flange, is itself held against rotation by the part upon which it is mounted, such as the non-rotatable axle tube shown in this instance.

From the foregoing description and the accompanying drawing, it will now be readily seen that I have provided an improved fluid retaining seal which may be applied to various devices and uses, but which is especially satisfactory for use with axle tube and wheel shaft assemblies of motor vehicles because it is self-adjustable to the extent that it will permit of more or less looseness in the wheel bearings without being damaged or sacrificing its efficiency as the result of such looseness, which would be the case with various other sealing devices of the prior art.

While I have illustrated and described the improved fluid retaining seal of my invention, it will be understood of course that I do not wish to be limited to the precise details and arrangements of parts herein disclosed but regard my invention as including such changes and modifications as do not constitute a departure from the spirit of the invention and the scope of the appended claim.

Having thus described my invention, I claim:

In combination, a tubular member, a rotatable shaft projecting from said member, a substantially radially extending flange on said shaft adjacent the end of said tubular member and presenting a dished face toward the latter, a nut on the tubular member adjacent the end thereof and having an annular groove in its outer end face and lying between the inner and outer peripheries of the nut, and a flexible lubricant retaining packing member having a ring portion engaging in said groove for supporting such packing member and locating the same with respect to the rotation axis and an annular flange portion connected with said ring portion and extending substantially radially inward therefrom, the outer face of said flange portion engaging the dished face of said flange and being sealingly pressed thereagainst by the flexibility of the packing member.

GUSTAV W. CARLSON.